United States Patent [19] [11] 4,422,737
Gribanov et al. [45] Dec. 27, 1983

[54] DEVICE FOR OBTAINING TOPOGRAPHIC PICTURE OF SURFACE OF ROTATING OBJECT

[76] Inventors: Dmitry D. Gribanov, ulitsa Chusovskaya, 11, korpus 6, kv. 35, Moscow; Vladimir P. Kulesh, ulitsa Stroitelnaya, 6, kv. 29, Zhukovsky, Moskovskaya oblast; Apollinary K. Martynov, 3 Frunzenskaya ulitsa, 3, kv. 40, Moscow; Anatoly A. Orlov, ulitsa Naberezhnaya Tsialkovskogo, 22, kv. 82, Zhukovsky, Moskovskaya oblast; Alexandr I. Sidorov, poselok Tomilino, ulitsa Gogolya, 24, kv. 73, Moskovskaya oblast, Ljuberetsky raion; Sergei D. Fonov, poselok Zarya, 180, kv. 52, Moskovskaya oblast, Balashikhinsky raion; Arkady V. Stepanov, ulitsa Serova, 18, kv. 22, Zhukovsky, Moskovskaya oblast, all of U.S.S.R.

[21] Appl. No.: 330,702

[22] Filed: Dec. 14, 1981

[51] Int. Cl.³ .................. G03B 19/18; G03B 21/32
[52] U.S. Cl. .................................... 352/39; 356/23; 356/376
[58] Field of Search .............. 352/39, 84; 356/360, 356/376, 23

[56] References Cited

U.S. PATENT DOCUMENTS

| 1,877,713 | 9/1932 | Beck | 356/23 |
|---|---|---|---|
| 1,973,066 | 9/1934 | Hauser et al. | 356/376 |
| 2,085,100 | 6/1937 | Knowles et al. | 356/23 |
| 2,216,003 | 9/1940 | Eppenstein et al. | 356/376 |
| 3,563,665 | 2/1971 | Takahashi et al. | 356/376 |
| 3,619,065 | 7/1971 | Agnew | 356/376 |
| 3,625,618 | 12/1971 | Bickel | 356/376 |
| 3,814,516 | 6/1974 | Free | 356/376 |
| 4,305,658 | 12/1981 | Yoshida | 356/23 |
| 4,335,962 | 6/1982 | Matteo et al. | 356/376 |

Primary Examiner—Monroe H. Hayes
Attorney, Agent, or Firm—McAulay, Fields, Fisher, Goldstein & Nissen

[57] ABSTRACT

A device for obtaining a topographic picture of the surface of a rotating object comprising turret assembly mounting a pulsed laser, a photorecorder, an optical system for forming a set of light planes, and a system designed to synchronize a laser emission instant as the rotating object passes a preset point on its path, as well as a reflector arranged on the axis of rotation of the object. The pulse laser, the optical system for forming a set of light planes, and the turret assembly are installed coaxially with the axis of rotation of the object.

14 Claims, 8 Drawing Figures

DEVICE FOR OBTAINING TOPOGRAPHIC PICTURE OF SURFACE OF ROTATING OBJECT

The present invention relates to measuring systems designed to determine an object's surface shape, more particularly to devices for obtaining a topographic picture of the surface of a rotating object.

Such devices find applications in various engineering fields, say, in quality control as a source of information on the shape of a workpiece, and also in determining object's deformation due to the action of particular loads, other possible uses being storage of information on the object's shape in the study of changes occurring in its surface or orientation in space over a certain time period and the like.

Topographic pictures of surface patterns may be obtained by the use of various optical devices which are conventionally divided into holographic and nonholographic facilities according to the method of converting information on surface patterns. Being comparatively simple the nonholographic facilities have so far found a wider field of uses (cf. Holographic Nondestructive Testing, ed. R. K. Erf, Academic Press, N.Y., London, 1974).

The nonholographic methods of analyzing surface patterns include the moire method and the so-called linear projection method. The former method essentially consists in that a grating is located in close proximity to the surface being investigated, said surface is struck by light through the grating, and distribution of light intensity on the surface through the grating is appropriately recorded. Such a method is not fully suitable for investigating objects moving in space since the grating has to be located in close proximity to the surface being investigated. If the above condition is not observed, light diffraction behind the grating will impair quality of a moire pattern formed due to interference of grating images and projection of the grating onto the investigated surface whereby a measuring error will be increased. The known devices utilizing the linear projection method have a number of advantages, namely a wide and continuous sensitivity variation range, possibility of real-time operation, and investigation with long distances between the object under study and the optical device. The two latter factors are of particular importance in analyzing the surface shape of moving objects or objects contained in a moving or corrosive medium. It is rather unfortunate that the above advantages may be used to a maximum extent only with certain objects during investigation provided that the surface under study is properly oriented. The above limitations are inherent in the linear projection method comprising the step of striking the surface under study with a light beam consisting of a set of light surfaces, specifically equidistant planes. Lines of intersection of the light planes and the investigated surface are equiheight lines. Apparently, the angle of illumination of the surface under study should be as close to a grazing angle as possible. Also it should be fairly great to avoid dark sections on said surface. On the other hand, the direction of the line of sight of a photorecorder indicating distribution of light intensity on the investigated surface should be chosen so that the focusing depth conditioned by curvature of the investigated surface is minimum. In this case the storage capacity of the photorecorder may be used to an optimum extent, other positive features being maximum sensitivity and measurement range.

In a known device (cf. French Patent No. 2,184,374, Int. Cl. G 02 b 11/00) comprising a laser, an optical system for forming a set of light planes incorporating a lens assembly and an interferometer, and a photorecorder, the surface under study is struck by two coherent light beams forming a measuring volume in the intersection area. Surfaces wherein an interference pattern has maximum intensity in the measuring volume may be conventionally regarded as light planes. The surface illuminated in the above manner is photographed whereupon the lines of intersection of the light planes and the investigated surface form a topographic picture of its surface. It is implied that, with the aforesaid device, illumination and recording are accomplished in an optimum manner, as has been previously described.

Those skilled in the art are frequently encountered with quite a few problems in determining the shape of the surface of moving objects which change their orientation in space. A typical problem of the kind is to describe the motion and bending and torsional strain of a rotor blade. Apart from its motion about the axis of rotation of the rotor, the blade moves in an intricate manner with respect to the flapping, lag, and feathering hinges and is subjected to bending and torsional strain. The afore-mentioned problems are peculiar in that, considering the shape of a surface and its variations in a broad sense of the word, the unknown characteristics of the surface to be determined are affected by characteristics conditioned by rotary motion and causing a continual change in orientation and position of the surface under study. With the foregoing devices the measurement range will, in the long run, be overloaded with irrelevant information whereby the accuracy and the measurement range will be substantially decreased.

Also known in the art are devices for obtaining a topographic picture of the surface of a rotating object (cf. U.S. Pat. No. 3,907,438, Int. Cl. G 01 B 11/24) comprising a laser, an optical system for forming a set of light planes, and a photorecorder whose recording plane is optically mated with the surface under study. In such devices the rotating surface under study is located so that the generatrix of a cylindrical surface is always parallel to light planes crossing the investigated surface and forming a topographic picture on its image.

The above requirement appreciably limits the class of surfaces to be investigated, more specifically it does not allow examining objects whose axis of rotation is inclined at a certain angle with respect to the surface under study and may change its orientation relative to it. (Consider, for example, the axis of rotation of a rotor with respect to its blade). The utilization of the aforesaid devices in the given case will substantially decrease the measurement range or reduce the measuring accuracy since the illumination conditions are far from being optimum.

To provide high precision and a fairly wide measurement range, it is essential that orientation of light planes at any angular position of the object under study should be close to optimum. Moreover, it should be interrelated in a known manner with the given angular position.

It is an object of the present invention to provide a high-precision device for obtaining a topographic picture of the surface of a rotating object which makes it possible to obtain a topographic picture of the surface in a wide range of variations of position and orientation of the rotating object.

The foregoing object is accomplished by that a device for obtaining a topographic picture of the surface of a rotating object, comprising a pulsed laser, an optical system for forming a set of light planes, and a photorecorder whose recording plane is optically mated with the rotating object under study, according to the invention, includes a system designed to synchronize a laser emission instant as the rotating object passes a preset point along its path, said laser being installed on a rotating turret assembly coaxially with the axis of rotation of the rotating object, said axis containing a reflector directing the laser emission at the rotating object.

Such an arrangement permits optimum orientation of a set of light planes at any angular position of the rotating objects, an advantage increasing accuracy and range in measuring coordinates of points on the surface of the rotating object by the use of a topographic picture of its surface.

Advantageously the synchronization system incorporates a source of emission directed at a given point along the path of the rotating object, and an emission detector recording a signal as the rotating object passes the preset point along its path and furnishing a sync signal to make the pulsed laser emit, said source and said detector being arranged on the turret assembly.

The device forming the subject of the present invention assures spatial synchronization of a set of light planes with respect to the plane of rotation of the investigated object in different angular positions thereof.

The optical system for forming a set of light planes may be arranged directly on the rotating object.

This permits real-time recording of a topographic picture of the surface of a rotating object.

A diffraction grating may be utilized as the optical system for forming a set of light planes.

This permits appreciably simplifying the device for forming a set of light planes and decreasing its dimensions.

A focusing system may be arranged along the axis of the pulsed laser.

The above feature allows reducing the influence of divergence of beams of the pulsed laser, particularly when the distance between the laser and the investigated object is fairly great, upon the effective thickness of the light planes.

Preferably the focusing system contains a collimator and a cylindrical lens rigidly coupled to the optical system for forming a set of light planes.

This provides constant orientation of the light planes with respect to the surface under study as it rotates about the axis of rotation thereof.

The system designed to synchronize the instant at which the object passes a preset point may incorporate a sensor indicating the instant at which the rotating object passes a predetermined angular position, said sensor being connected to a clock pulse generator whose output is coupled to the pulsed laser.

The above feature permits obtaining a series of topographic pictures of the surface of a rotating object in different angular positions thereof with a preset initial phase of the series.

Desirably the synchronization system comprises a flip-flop whose set input is connected to the output of the sensor indicating the instant at which the rotating object passes a predetermined angular position, the output of the flip-flop being connected to the clock pulse generator, and a pulse counter having its input connected to the clock pulse generator and its output coupled to the reset input of the flip-flop.

This allows providing a desired length of a series of topographic pictures and avoiding their superposition when the object is further turned.

The synchronization system may include a controllable delay line inserted between the sensor indicating the instant the rotating object passes a predetermined angular position and, the flip-flop, as well as a second pulse counter whose input is connected to the output of the first pulse counter, while the output thereof is coupled to a digital control input of said delay line.

The above feature allows obtaining a series of topographic pictures as the rotating object makes two or more revolutions.

Preferably the device incorporates a unit for controlling position of the turret assembly, said unit comprising a sensor indicating present position of the turret assembly, a sensor indicating preset position of the turret assembly, and a circuit used to compare said signals, the comparison circuit being also connected to the output of the emission detector, the output of the comparison circuit being connected to the pulsed laser which operates when the signals at the input of the comparison circuit are equal and, at the same time, a signal is applied from the output of the emission detector.

This permits expediting the process of recording topographic pictures of the surface of a rotating object in different angular positions thereof.

The emission source of the synchronization system may be a CW laser having a shutter, while the output of the comparison circuit may be connected to the pulsed laser and also to the shutter of the CW laser and to the shutter of the photorecorder.

This prevents exposure of the photorecorder to radiation from the CW laser and enhances accuracy of synchronization of pulsed laser response at the instant when the rotating object passes a predetermined angular position.

The invention will now be described with reference to specific embodiments thereof, taken in conjunction with the accompanying drawings, wherein.

Figure 1:
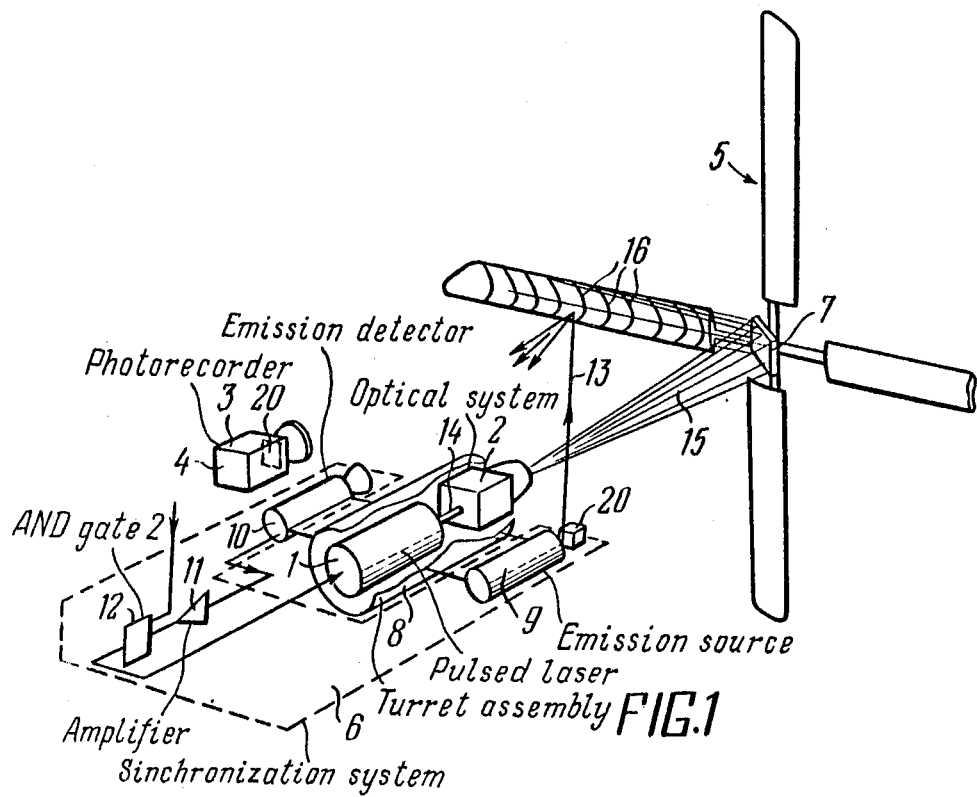
FIG. 1 depicts diagrammatically a device for obtaining a topographic picture of the surface of a rotating object according to the invention.
Figure 2:
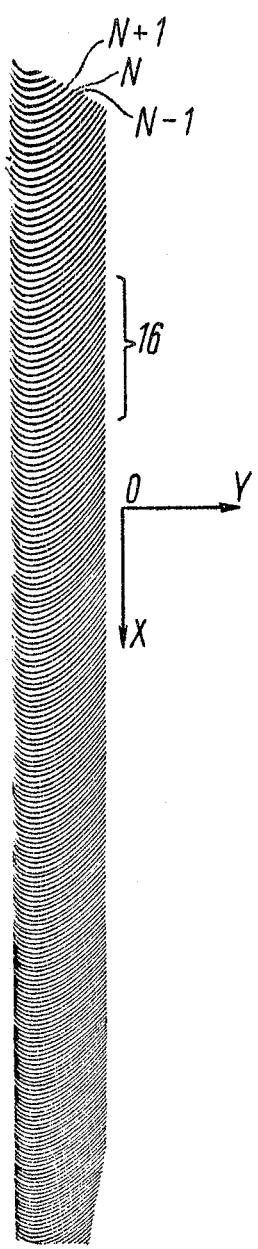
FIG. 2 is a topographic picture of the surface of an object under study, say a blade of a rotor model, obtained by the device according to the invention.

Referring to the drawings the device for obtaining a topographic picture of the surface of a rotating object in compliance with the invention comprises a pulsed laser 1 (FIG. 1), an optical system 2 for forming a set of light planes, a photorecorder 3, a recording plane 4 of which is optically mated with an object 5 under study, say a blade of a rotor model, a synchronization system 6, a reflector 7 arranged on the axis of rotation of the investigated object 5 and directing radiation from the laser 1 at the object 5 under study. The laser 1, the optical system 2 for forming a set of light planes, the synchronization system 6, and the photorecorder 3 are installed on a rotating turret assembly 8 whose axis of rotation coincides with the axis of rotation of the investigated object 5. The synchronization system 6 includes an emission source 9, say a CW laser, its radiation being directed at a preset point along the path of the rotating object 5, an emission detector 10 which is a photoelectric detector when use is made of a laser, the output of said detector is coupled to the trigger input of the pulsed laser 1 through a shaping amplifier 11 and an AND gate 2 (marked with reference numeral 12 in the drawing). The optical axes of the pulsed laser 1, the system 2 for forming a set of light planes, the photorecorder 3, the light source 9 of the synchronization system, and the photodetector 10 are preferably disposed in a single plane orthogonal to the light planes. To obtain a topographic picture of the surface of the rotating object 5, the turret assembly 8 is turned to assume a desired angular position. When the moving object 5 crosses a light beam 13 from the laser 9, the light dispersed by the surface gets into the photodetector 10, wherein it is converted into an electrical signal which is normalized in the shaping amplifier 11 and fed via the AND gate 2 (marked with reference numeral 12 in the drawing) with its second input accepting an enabling signal to trigger the pulsed laser 1. Having passed the optical system 2, a light beam 14 from the pulsed laser 1 is converted into a set of light planes 15 moved by the reflector 7 onto the surface of the object 5 under study. Traces 16 of intersection of the light planes and the surface of the object 5 produce a topographic picture (FIG. 2) which is recorded by the photorecorder 3. The obtained topographic picture conveys information on the shape of the surface of an object under study (a blade of a rotor model in the given case) and also on the attitude thereof. Thereafter the turret assembly 8 is turned to assume another azimuthal position, and the recording cycle is repeated. Since the synchronization system is disposed on the rotating turret assembly 8, the topographic picture is recorded with constant relative position of the system 2 for forming a set of light planes and the reflector 7, a feature enhancing a measuring accuracy.

The system 2 for forming a set of light planes may be conveniently represented by an optical system composed of an interferometer (not shown in the drawing) producing two intersecting coherent light beams, and a lens assembly (not shown in the drawing) expanding said beams to a desired diameter and converging them in the vicinity of the surface under study. The coherent light beams intersecting in close proximity to the investigated surface form a measuring volume composed of a set of light planes (maximum interference patterns). It will be proved that exposure distribution $I_F(x, y)$ (FIG. 2) in the plane where the image of the investigated surface is formed may be defined by the expression $$I_F(x,y) = I_o \left[ 1 + B_\Sigma(\bar{w}) \cos \left( \Omega_Z F(x,y) + \int_o^x \Omega_x(\xi) d\xi \right) \right],$$

where $\Omega_Z$, $\Omega_X$ are components of light intensity spatial modulation frequency vector $\vec{\Omega}$ within the measuring volume, which differ from zero; $F(x,y)$ is the function defining the shape of the surface under study; $I_o$ is mean exposure in the image plane; $B_\Sigma(W)$ is the amplitude-frequency response of the photorecorder 3; and $\overline{W} \simeq \Omega_Z$ grad $F + \Omega_x$ is the medium modulation frequency of the topographic picture.

The lines 16 of intersection of the light planes and the investigated surface are described by a set of equations:

$$\Omega_Z F(x_N, y_N) + \int_o^{x_N} \Omega_x(\xi) d\xi = 2\pi \cdot N$$

where $N = 1 \pm 1, \pm 2, \ldots$; $x_N$, $y_N$ are coordinates of points relating to the Nth intersection line.

From the above equations it follows that $$F(x_N, y_N) = \frac{2\pi N - \int_o^{x_N} \Omega_x(\xi) d\xi}{\Omega_Z} \quad (1)$$

Thus, to determine the shape of the surface using a topographic picture, it is necessary to compute distribution $\vec{\Omega}$ within the measuring volume and find coordinates of interference bands on the topographic picture. This is done by scanning the topographic picture, say, by the use of a microphotometer (not shown in the drawing) and by computing exposure extremum coordinates. An error $\rho_N$ in determining extremums, expressed in fractions of interference bands may be evaluated as follows:

$$\sigma_N \sim \frac{1}{B_d(\bar{w}) B_\Sigma(\bar{w})} \sqrt{\frac{G_o}{S}}, \quad (2)$$

where $G_o$ is spectral noise power of the topographic picture; $B_d(\omega)$, $S$ are, respectively, amplitude-frequency response and effective aperture area of the scanning device of the microphotometer (not shown in the drawing).

From equations (1) and (2) it follows that the error $\rho_F$ in measuring coordinates of various points on the surface (if $\vec{\Omega}$ is precisely known and the coordinate measuring error is neglected) may be evaluated as follows:

$$\sigma_F \sim \frac{2\pi}{\Omega_Z B_\Sigma(\bar{w}) B_d(\bar{w})} \sqrt{\frac{G_o}{S}}, \quad (3)$$

where $B_\Sigma(\overline{W})$, $B_d(\overline{W})$ are monotonically decreasing functions of spatial modulation frequency $\vec{\Omega}$. So, referring to equation (3) it is seen that there is a certain value of $\vec{\Omega}$ which provides a minimum measuring error. The above evaluation shows the need for an optimum choice of illumination and recording directions to attain a maximum measuring accuracy. In the device forming the subject of the invention the above requirement is fulfilled by maintaining constant orientation of the light planes 15 and the photorecorder 3 to a high accuracy with respect to the rotating object 5 under study in any angular positions thereof.

Figure 3:
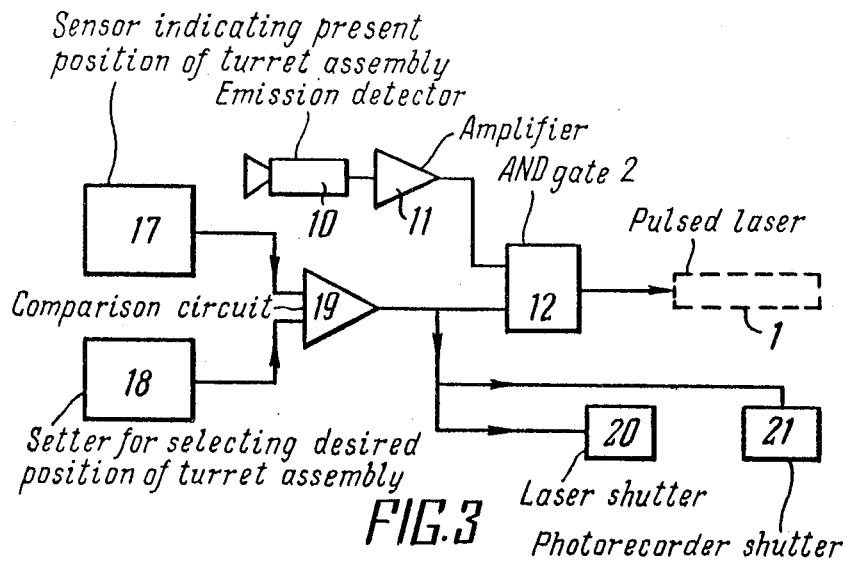
FIG. 3 is a block diagram of a synchronization system according to the invention, which permits obtaining a topographic picture of the surface of the object in a predetermined angular position.

As a rule, the process of obtaining a topographic picture of the surface of a rotating object presents special interest in different angular positions thereof, for example in the range from 0° to 360° in steps of, 5° to 10°. To expedite the recording process, the device is provided with an electronic unit designed to control position of the turret assembly 8 (FIG. 3), said unit comprising a sensor 17 indicating present position of the turret assembly 8, a setter 18 for selecting a desired position of the turret assembly 8, a circuit 19 used to compare signals from the sensor 17 and the setter 18, said comparison circuit being connected to the second input of the AND gate 2 (marked with reference numeral 12 in the drawing). To prevent undesired exposure of the photorecorder 3 to radiation from the synchronization laser 9, the output of the comparison circuit 19 is also connected to a shutter 20 installed in front of the synchronization laser 9 and to a shutter 21 of the photorecorder 3. A desired angular position of the turret assembly 8 is set by the use of the setter 18 for selecting position of the turret assembly. Thereafter the turret assembly 8 is rotated. When the output signals of the elements 17 and 18 get equal, the output of the comparison circuit 19 develops a signal enabling passage of a sync signal to trigger the pulsed laser 1. The output signal of the comparison circuit 19 is also used to open the shutters 20 and 21, said shutters being closed after the sync signal is passed through.

Figure 4:
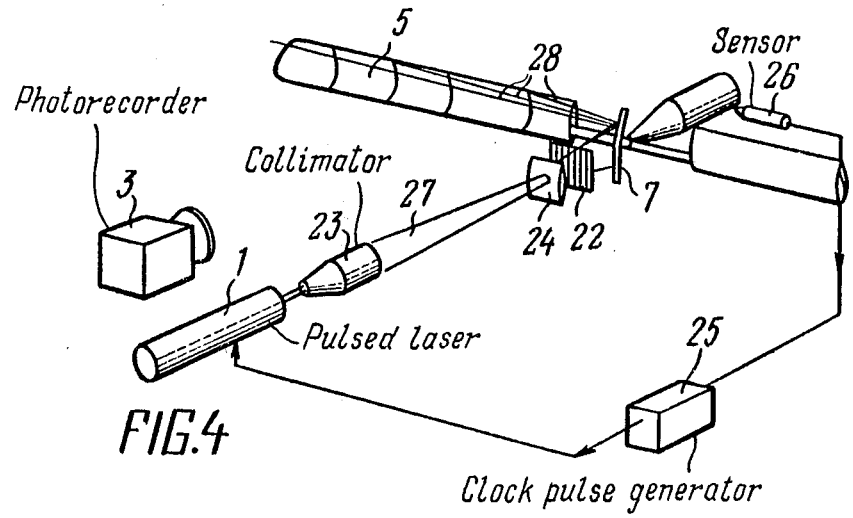
FIG. 4 is a schematic illustrating attitude of the device according to the invention with a system for forming a set of light planes arranged along the axis of rotation of the investigated object.

From the aforesaid it follows that, at great rates of rotation, the investigated object 5 makes several turns between the recording cycles. Thus, information on behaviour of the investigated object 5 in the entire range of turn angles may be obtained assuming that we deal with a stationary phenomenon. On the other hand, there exist problems wherein it is necessary to obtain information on the shape of the object's surface and on its changes during one revolution. In this case it is essential that the optical system for forming a set of light planes should be located on the rotating object 5 (FIG. 4) along its axis of rotation, a feature assuring optimum orientation of the light planes. In dealing with objects having great rates of rotation it is essential that the system for forming a set of light planes should be compact and robust. A diffraction grating 22 may act as the aforesaid system to meet the above requirement. Arranged along the optical axis of the pulsed laser 1 are a focusing system comprising a collimator 23 which may be installed on the turret assembly 8, and a cylindrical lens 24 located in front of the diffraction grating 22. The pulsed laser 1 is triggered by a clock pulse generator 25 which, in turn, is triggered by a signal from a sensor 26 indicating the instant at which the rotating object 5 passes a predetermined angular position. The parameters of the collimator 23 are selected so that a laser beam 27 is focused in close proximity to the object under study. The cylindrical lens 24 turns the focused beam into the respective plane, while light diffraction on the grating 22 causes formation of a set of light planes (diffraction sequences 28). A phase diffraction grating may, for example, be used to decrease light losses within the diffraction grating 22, to reduce, simultaneously probability of its damage by high-power pulsed radiation of the laser 1, and to enable more uniform distribution of light in diffraction sequences.

Figure 5:
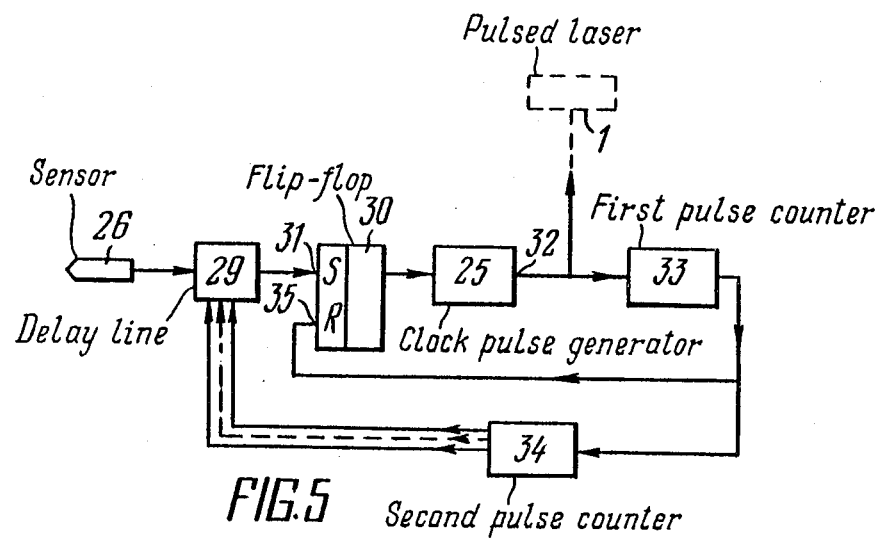
FIG. 5 is a block diagram of a synchronization system designed to obtain sequences of topographic pictures in some angular positions of the object under study according to the invention.
Figure 6:
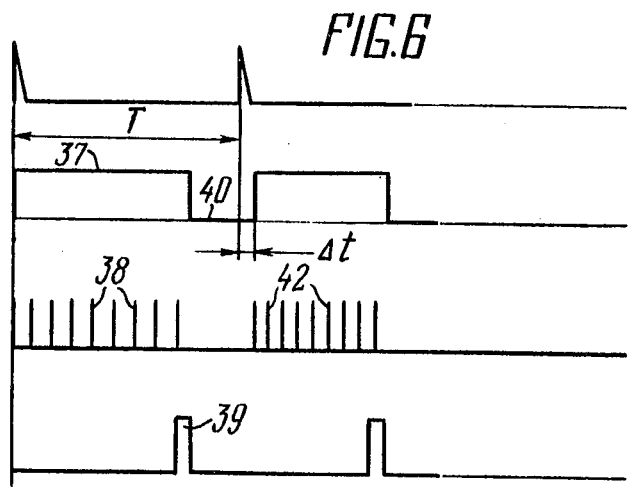
FIG. 6 is a timing diagram illustrating operation of the synchronization device for obtaining a sequence of topographic pictures according to the invention.

The reccurrence rate of clock pulses and their number are selected to provide a desired sampling frequency in analyzing the given process. In instances when the analyzed process continues for more than one revolution of the object, the synchronization system may be designed as follows. A delay line 29 controlled by a digital code and a flip-flop 30 are placed in series between the sensor 26 (FIG. 5) indicating the instant at which the rotating object passes a predetermined angular position and the clock pulse generator 25, the output of the delay line 29 being connected to a set input 31 of the flip-flop 30. An output 32 of the clock pulse generator is connected to the laser 1 and also to the input of a first pulse counter 33 whose output is, in turn, coupled to the input of a second counter 34 and to a reset input 35 of the flip-flop 30. The outputs of the second counter 34 are connected to the code-controlled delay line 29. FIG. 6 is a timing diagram illustrating operation of the device forming the subject of the present invention. Before a recording cycle is started, the counters 33, 34 are cleared, and the shutter of the photorecorder 3 is opened. In this state the controllable delay line 29 provides a zero delay. As the object under study reaches a predetermined angular position, there is generated a sync signal 36 which is fed through the delay line 29 to change the flip-flop 30 to a one state 37. As this happens, the clock pulse generator 25 is triggered, its pulses 38 trigger the pulsed laser 1 and are read by the first counter 33. After the first counter 33 is filled, its output develops a signal 39 which returns the flip-flop 30 to a zero state 40 and changes the state of the second counter 34, the changing code at the output of the second counter 34 increasing the amount of delay set by the line 29 by a discrete value $\Delta t < < T$ where T is the reccurrence rate of the clock pulses. Thus, the next sync pulse 41 sets the flip-flop 30 with a delay of $\Delta t$, clock pulses 42 being delayed accordingly. During the next recomputation cycle, the clock pulses will be delayed by $2\Delta t$ and so forth. Such an arrangement of the synchronization system permits, within one frame of the photorecorder 3, recording a topographic picture on the investigated object during two, three and more revolutions.

Figure 7:
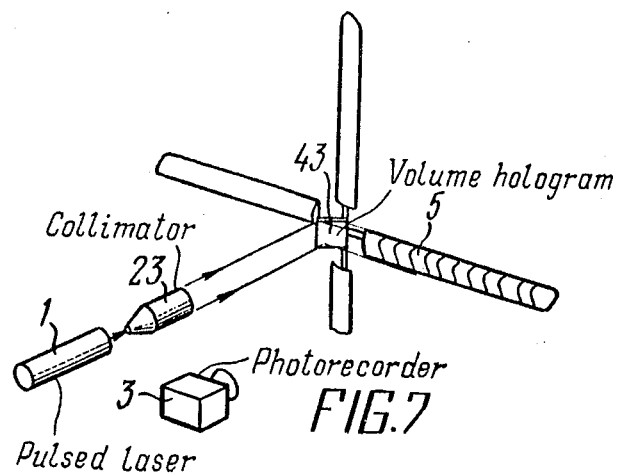
FIG. 7 is another embodiment of the device according to the invention, wherein a volume hologram is used for obtaining a set of light planes.
Figure 8:
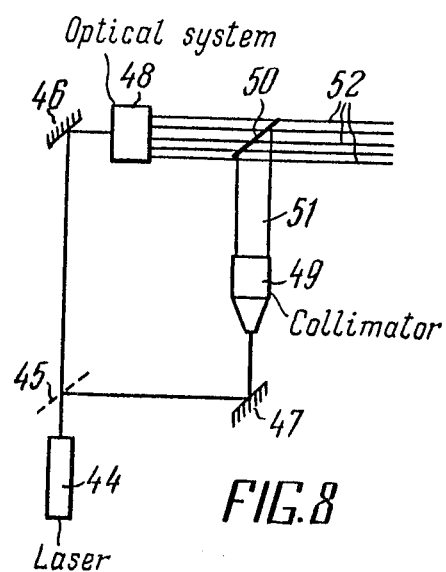
FIG. 8 shows diagrammatically an optical system for obtaining the volume hologram according to the invention.

From the aforesaid it follows that, with relative misalignment of the axes of the pulsed laser 1 and the axis of rotation of the rotating object 5 under study, the light planes 15 crossing its surface are displaced, which may cause errors in determining the shape of the investigated object. To provide invariance of the device under linear displacements, a volume hologram 43 (FIG. 7) is advantageously used as the optical system for forming a set of light planes, said hologram being arranged on the axis of rotation of the object under study, while collimator 23 is arranged along the optical axis of the pulsed laser 1. To obtain the volume hologram 43, use is made of an optical system of FIG. 8, which includes a laser 44, a beam splitter 45, mirrors 46, 47, an optical system 48 for forming a set of light planes, a collimator 49, and a holographic photoplate 50. A collimated beam 51 is used as a reference beam, while the light beams at the output of the system 48 form an object wave front. As the obtained hologram is reconstructed by the collimated beam 51, there are formed planes 52 which are similar to those at the output of the system 48. Apparently, the reconstructed system of light planes is invariant under relative linear displacements of the collimated beam and the axis of rotation of the object being investigated.

The hereinproposed device may be utilized to obtain topographic pictures of surfaces of a wide class of objects. For example, it is suitable for determining deformation of wings of aircraft models in a wind tunnel or for analyzing the surfaces of intricately shaped parts which should be illuminated from different sides. As has been stated, to provide optimum illumination and orientation conditions, it is necessary to change orientation of light planes. The synchronization system incorporated in the proposed device permits time and spatial synchronization of orientation of light planes with respect to the investigated surface with high accuracy and adequate reproduction.

As a rule, additional requirements are placed upon a laser light source and a photorecorder in determining the shape of an object's surface, i.e. in obtaining a topographic picture of its surface in analyzing fast processes. Apart from high pulse energy and short pulse duration, it is necessary to provide a high recurrence rate of a generating pulse and the corresponding operating frequency of the photorecorder. In the described device, difficulties involved in solving the above problems are substantially eliminated due to optimum distribution of laser emission energy in time and space on the investigated surface.

What is claimed is:

1. A device for obtaining a topographic picture of the surface of a rotating object, comprising:
   a turret assembly whose axis of rotation coincides with the axis of rotation of said rotating object;
   a pulsed laser installed on said turret assembly coaxially with its axis of rotation;
   an optical system forming a set of light planes from a light beam coming from said pulsed laser;
   a reflector arranged on the axis of rotation of said rotating object and directing said light planes at the surface of the rotation object;
   a photorecorder installed on said turret assembly and having its recording plane optically mated with said rotating object, said photorecorder being used to record intersection of said light planes with the rotating object;
   a system designed to synchronize an instant at which said pulsed laser emits as said rotating object passes preset points on its path, including:
      an emission source installed on said rotating turret, the emission source being directed at a present point along the path of the rotating object, and
      a detector receiving radiation from said source, recording it as said rotating object passes present points along its path and furnishing a signal enabling synchronous emission of said pulsed laser; and
   a unit controlling position of said turret assembly, including:
      a sensor indicating present position of said turret assembly, and
      a sensor indicating the preset position of said turret assembly; and
   a circuit designed to compare the present position of the turret assembly with the preset position thereof, said comparison circuit having three inputs and an output, said first input being connected to said sensor indicating the present position of the turret assembly, the second input being connected to said sensor indicating the preset position of said turret assembly, while the third input is connected to said emission detector, the output of said comparison circuit being connected to said pulsed laser to enable its operation at the instant aa signal is applied from said emission detector.

2. A device as claimed in claim 1, wherein optical axes of said pulsed laser and said photorecorder, as well as the emission direction of said emission source and the reception direction of said emission detector are found in a single plane.

3. A device as claimed in claim 1, wherein said emission source of said system designed to synchronize the laser emission instant as said rotating object passes preset points along its path represents a CW laser provided with a shutter preventing radiation from said CW laser at the instant a topographic picture of the rotating object is recorded.

4. A device as claimed in claim 1, wherein a diffraction grating is used as said optical system for forming a set of light planes.

5. A device as claimed in claim 1, which includes an optical focusing system arranged along the optical axis of said pulsed laser and comprises:
   a collimator arranged along the optical axis of said pulsed laser; and
   a cylindrical lens arranged along the optical axis of the pulsed laser and rigidly coupled to said optical system for forming a set of light planes.

6. A device as claimed in claim 1, comprising:
   a diffraction grating acting as said optical system for forming a set of light planes;
   a collimator arranged along the optical axis of said pulsed laser; and
   a cylindrical lens arranged along the optical axis of the pulsed laser and rigidly coupled to said diffraction grating.

7. A device as claimed in claim 1, wherein a volume hologram is used as said optical system for forming a set of light planes.

8. A device for obtaining a topographic picture of the surface of a rotating object comprising:
   a turret assembly;
   a pulsed laser installed on said turret assembly coaxially with the axis of rotation of the rotating object;
   an optical system installed on said rotating object, forming a set of light planes, and directing them at the surface of the rotating object;
   a system designed to synchronize the instant at which the pulsed laser emits as the rotating object passes preset points along its path;
   a photorecorder whose recording plane is optically mated with the plane of rotation of the rotating object, said photorecorder being used to record intersection of said light planes with the surface of the rotating object;
   a system designed to synchronize the instant at which the pulsed laser emits as said rotating object passes the present points along its path, including:
      a sensor indicating the instant the rotating object passes the present angular position,
      a flip-flop having two (set and reset) inputs and an output, said set input of the flip-flop being connected to said sensor indicating the instant at which the rotating object passes the present angular position,
      a clock pulse generator whose input is connected to the output of said flip-flop, while its output is connected to said pulsed laser, and a pulse counter whose input is connected to the output of said clock pulse generator, while its output is coupled to said reset input of the flip-flop.

9. A device as claimed in claim 8, wherein a diffraction grating is used as said optical system for forming a set of light planes.

10. A device as claimed in claim 8, which includes an optical focusing system arranged along the optical axis of said pulsed laser.

11. A device as claimed in claim 10, wherein said optical focusing system comprises:

a collimator arranged along the optical axis of said pulsed laser;

a cylindrical lens arranged along the optical axis of the pulsed laser and rigidly coupled to said optical system for forming a set of light planes.

12. A device as claimed in claim 8, comprising:

a diffraction grating acting as said optical system for forming a set of light planes;

a collimator arranged along the optical axis of said pulses laser;

a cylindrical lens arranged along the optical axis of the pulsed laser and rigidly coupled to said diffraction grating.

13. A device as claimed in claim 8, wherein a volume hologram is used as said optical system for forming a set of light planes.

14. A device as claimed in claim 8, wherein said system designed to synchronize the instant at which the pulsed laser emits as the rotating object passes preset points along its path, comprising:

a controllable delay line having several control inputs, a trigger input, and an output, said trigger input being connected to said sensor indicating the instant at which the rotating object passes the preset angular position, while its output is coupled to said set input of said flip-flop;

a second pulse counter whose input is connected to the output of said first pulse counter, while the outputs thereof are coupled to the inputs of said delay line.

* * * * *